United States Patent
Yamada et al.

(10) Patent No.: US 8,280,390 B2
(45) Date of Patent: Oct. 2, 2012

(54) MOBILE STATION APPARATUS, PROGRAM FOR CONTROLLING THEREOF AND DATA TRANSMITTING METHOD

(75) Inventors: Shohei Yamada, Osaka (JP); Tatsushi Aiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/328,624

(22) Filed: Dec. 16, 2011

(65) Prior Publication Data

US 2012/0088512 A1 Apr. 12, 2012

Related U.S. Application Data

(63) Continuation of application No. 12/864,281, filed on Sep. 23, 2010, now Pat. No. 8,112,092.

(30) Foreign Application Priority Data

Jan. 25, 2008 (JP) .................................. 2008-015011

(51) Int. Cl.
*H04Q 7/20* (2006.01)
(52) U.S. Cl. ..................... 455/450; 370/270; 370/230
(58) Field of Classification Search ................. 455/451, 455/452.1, 452.2
See application file for complete search history.

(56) References Cited

U.S. PATENT DOCUMENTS

| | | | | |
|---|---|---|---|---|
| 7,885,211 B2 * | 2/2011 | Shen et al. | ..................... | 370/278 |
| 7,898,948 B2 * | 3/2011 | DiGirolamo et al. | ......... | 370/230 |
| 2008/0045228 A1 * | 2/2008 | Zhang et al. | ................... | 455/450 |
| 2008/0310360 A1 | 12/2008 | Heo et al. | | |
| 2008/0311919 A1 | 12/2008 | Whinnett et al. | | |
| 2010/0113057 A1 * | 5/2010 | Englund et al. | ............ | 455/452.1 |
| 2010/0202306 A1 | 8/2010 | Jersenius et al. | | |

FOREIGN PATENT DOCUMENTS

| | | |
|---|---|---|
| WO | WO 2006/134950 A1 | 12/2006 |
| WO | WO 2009/045139 A1 | 4/2009 |

OTHER PUBLICATIONS

"3rd Generation Partnership Project;Technical Specification Group Radio Access Network; Physical Channels and Modulation" (Release 8), 3GPP TS 36.211 v1.1.0, May 1, 2007, pp. 1-34.
"Channel feedback format selection", 3GPP TSG-RAN WG1 Meeting #51, Nov. 5-9, 2007, Korea, R-074854, pp. 1-6.
"CQI Reporting on the PUSCH", 3GPP TSG-RAN WG1 #51bis, Sevilla, Spain, Jan. 14-18, 2008, RI-080363, pp. 1-2.
"CQI Trigger Mechanism", 3GPP TSG-RAN WG1 Meeting #50bis, Shanghai, China, Oct. 8-12, 2007, R1-074353, pp. 1-6.
"On CQI Reporting in E-UTRA", 3GPP TSG RAN WG1 Meeting #50bis, Shanghai, China, Oct. 8-12, 2007, R1-074289, pp. 1-4.

(Continued)

*Primary Examiner* — Charles Shedrick
(74) *Attorney, Agent, or Firm* — Birch, Stewart, Kolasch & Birch, LLP

(57) ABSTRACT

In case that an uplink grand from a base station apparatus is detected on PDCCH, a data designated by the uplink grant, channel state information measured at the time of transmission are transmitted by PUSCH as an uplink transmission signal. Then, in case that a notice that indicates retransmission is received, the data to be retransmission and the channel state information measured at the time of retransmission are transmitted by PUSCH. Accordingly, the mobile station apparatus can transmit appropriate channel state information when designated to retransmission so that the base station apparatus can make an efficient communication control (scheduling) between the base station apparatus and the mobile station apparatus that is suitable for the current channel condition.

3 Claims, 14 Drawing Sheets

OTHER PUBLICATIONS

"RV definition for UL-SCH", 3GPP TSG RAN WGI Meeting #51bis, Sevilla, Spain, Jan. 14-18, 2008, R1-080043, pp. 1-2.

Ericsson, "Channel feedback format selection", 3GPP TSG-RAN WG1 Meeting #51, Nov. 5-9, 2007 (Retrieved on Oct. 31, 2007), Korea, R-074854, pp. 1-6.

Nokia et al. "CQI Trigger Mechanism", 3GPP TSG-RAN WG1 Meeting #50bis, Shanghai, China, Oct. 8-12, 2007 (Retrieved on Oct. 2, 2007), R1-074353, pp. 1-6.

Panasonic et al, "Signaling of CQI only on PUSCH", 3GPP TSG-RAN WG1 Meeting #53, Kansas City, USA, May 5-9 (Retrieved on May 14, 2008), 2008, R1-082190.

Philips, "Dynamic Scheduling", 3GPP TSG-RAN WG2 #60bis, Sevilla, Spain, Jan. 14-18, 2008 (Retrieved on Jan. 7, 2008), R2-080308, pp. 1-4.

Philips, "UE procedure for ACK/NACK detection", 3GPP TSG RAN WG1 Meeting #51bis, Sevilla, Spain, Jan. 14-18, 2008 (Retrieved on Jan. 9, 2008), R1-080459, pp. 1-3.

IPWireless: "CQI reporting and resource allocation for CQI reporting w.r.t. DRX level", 3GPP Draft; R2-071419, 3rd Generation Partnership Project (3GPP), Mobile Competence Centre; 650, Route Des Lucioles; F-06921 Sophia-Antipolis Cedex; France, vol. RAN WG2, No. St. Julian; 20070323, XP050134358.

* cited by examiner

MOBILE STATION APPARATUS, PROGRAM FOR CONTROLLING THEREOF AND DATA TRANSMITTING METHOD

This application is a Continuation of application Ser. No. 12/864,281, filed on Sep. 23, 2010 now U.S. Pat. No. 8,112,092, the entire contents of which are hereby incorporated by reference and for which priority is claimed under 35 U.S.C. §120.

TECHNICAL FIELD

The present invention relates to a mobile station apparatus and a program.

BACKGROUND ART

3GPP (3rd Generation Partnership Project) is a project in which the specification of a mobile phone system, based on a network that is evolved from W-CDMA (Wideband-Code Division Multiple Access) and GSM (Global System for Mobile Communications), is examined and prepared. In 3GPP, the W-CDMA scheme is standardized as the third generation cellular mobile communication scheme, and the service has been started one after another. Besides, HSDPA (High-Speed Downlink Packet Access) that is further improved in communication speed has been also standardized and the service has been started. In 3GPP, the evolution of the third generation radio accessing technology (Evolved Universal Terrestrial Radio Access: referred to hereinafter as "EUTRA") has been investigated.

As the downlink communication scheme in EUTRA, an OFDMA (Orthogonal Frequency Division Multiple Access) scheme in which subcarriers orthogonal to each other are used to achieve user-multiplexing has been proposed. Further, in the OFDMA scheme, a technology called adaptive modulation and demodulation and error correction scheme (AMCS: Adaptive Modulation and Coding Scheme) based on adaptive radio link control (Link Adaptation) for channel coding etc. has been applied. AMCS is a scheme that switches radio transmission parameters (which will be referred to hereinbelow as AMC modes) such as an error correction method, error correction coding rate, data modulation level and so on, in accordance with the channel quality of each mobile station apparatus, in order to achieve efficient high-speed packet data transmission. The channel quality of each mobile station apparatus is fed back to a base station apparatus using CQI (Channel Quality Indicator).

In OFDMA, the communicatable domain can be divided into the frequency domains that physically correspond to subcarriers and the time domains. A set of several divided domains is called a resource block, and one or a number of resource blocks are assigned to each mobile station apparatus so as to perform multiplexing communication of plural mobile station apparatuses. In order to enable the base station apparatus and each mobile station apparatus to perform communication at the requested optimal quality and speed, it is necessary to determine assignment of resource blocks and a transmission scheme by considering the channel quality of the frequency band that corresponds to each subcarrier of each mobile station apparatus. Since the transmission scheme and scheduling are handled by the base station apparatus, in order to realize this request, the channel qualities for each frequency domain are fed back from each mobile station apparatus to the base station. Further, if necessary, information representing the frequency domains with high channel qualities may be fed back from each mobile station apparatus to the base station.

Furthermore, in EUTRA, in order to increase the channel capacity, use of transmission diversity such as SDM (Space Division Multiplexing: space multiplexing technology) by using MIMO (Multiple Input Multiple Output), SFBC (Space-Frequency Block Diversity), CDD (Cyclic Delay Diversity) has been proposed. The MIMO is the general term for multiple input/multiple output scheme or technologies, and is characterized by performing transmission by using multiple antennas at both the transmission side and reception side so as to pluralize the number of branches of wave input/output. The unit of signal sequences that can be transmitted by spatial multiplexing by using the MIMO scheme is called a stream. The number of streams (Rank) during MIMO communication is determined by the base station apparatus, taking into account the channel condition. The number of streams (Rank) requested by the mobile station apparatus is fed back from the mobile station apparatus to the base station apparatus, by using RI (Rank Indicator).

Further, in using SDM on downlink, in order to correctly separate information on multiple streams transmitted from individual antennas, it has been investigated that the transmission signal sequences are subjected to preprocessing (this is called precoding). The information on precoding is calculated based on the channel condition estimated by the mobile station apparatus, and is fed back from the mobile station apparatus to the base station apparatus by using PMI (Precoding Matrix Indicator).

In this way, in order to realize communication at the optimum quality, it is necessary to feed back various kinds of information that represents the channel condition, from each mobile station apparatus to the base station apparatus. This channel state information is made up of CQI, PMI, RI and the like. The number of bits and format of these pieces of channel state information are designated to the mobile station apparatus by the base station apparatus, depending on the circumstances.

Here, FIG. 11 shows a channel configuration in EUTRA. The downlink for EUTRA is configured of a downlink pilot channel DPiCH (Downlink Pilot Channel), a downlink synchronization channel PSCH (Physical Downlink Synchronization Channel), a downlink shared channel PDSCH (Physical Downlink Shared Channel), a downlink control channel PDCCH (Physical Downlink Control Channel), a downlink HARQ acknowledgement indicator channel PHICH (Physical HARQ Acknowledgement Indicator Channel) and a downlink broadcasting channel PBCH (Physical Broadcast Channel).

The uplink for EUTRA is configured of an uplink pilot channel UPiCH (Uplink Pilot Channel), a random access channel RACH (Random Access Channel), an uplink shared channel PUSCH (Physical Uplink Shared Channel) and an uplink control channel PUCCH (Physical Uplink Control Channel) (see non-patented document 1, for example).

In FIG. 12, the horizontal axis represents time and the vertical axis represents frequency. FIG. 12 shows the configuration of one radio frame. This radio frame is split into a plurality of radio resources. The domain of 1 ms wide in the temporal direction is called a subframe. The radio resources are given in units of a domain of 180 kHz wide in the frequency direction and 1 ms wide in the temporal direction, and PUSCH and PUCCH are assigned for these domains as shown in the drawing.

The channel state information is fed back by using PUCCH or PUSCH. The properties of the uplink single carrier make it impossible for the mobile station apparatus to transmit a plurality of channels simultaneously. PUCCH is used to transmit ACK (Positive Acknowledgement)/NACK (Negative Acknowledgement) used for HARQ (Hybrid Automatic Repeat Request) of downlink data and transmit channel state information.

PUSCH is mainly used to transmit uplink data. When the channel state information is not transmitted by PUCCH, the channel state information is transmitted together with the uplink data. In general, PUSCH has a greater resource assigned to transmit the channel state information within one subframe than PUCCH.

On the other hand, HARQ is applied for transmission of the uplink shared channel (PUSCH). In retransmitting of HARQ, there are two kinds of methods, one is chase combining in which retransmission identical to the previous transmission is transmitted and combined at the receiving side, and the other is incremental redundancy in which information which is not previously sent is additionally transmitted. The retransmission data is also generated from the same transport block from which new data was generated.

Now, FIG. 13 shows an uplink transmission procedure. In FIG. 13, the base station apparatus is depicted on the right side while the procedures of the mobile station apparatus are depicted on the left side.

Further, a subframe that the mobile station apparatus receives the data from the base station apparatus is called a downlink subframe (D-subframe) and a subframe that the mobile station apparatus transmits the data to the base station apparatus is called an uplink subframe (U-subframe).

Downlink subframes and uplink subframes are respectively depicted on the left and right sides in FIG. 13 for explanation. Here, the downlink subframe and the uplink subframe are not necessarily timed to each other.

To begin with, in order to transmit new data, an uplink grant is transmitted from the base station apparatus to the mobile station apparatus on PDCCH. The mobile station apparatus decodes on PDCCH to detect an uplink transmission grant signal (the uplink grant) to the mobile station apparatus (D-subframe #2).

This uplink grant includes a new data indicator that indicates new data. Then, after a fixed processing time associated with D-subframe #2 (uplink subframe U-subframe #6), the uplink data (new data) is transmitted on PUSCH.

The base station apparatus performs a decoding process of the uplink data and transmits a reply signal to the mobile station apparatus on PHICH. Specifically, the base station apparatus transmits to the mobile station apparatus by using PHICH, a positive reply (ACK) in case that CRC (Cyclic Redundancy Check) has succeeded, and a negative reply (NACK) in case that the CRC has failed.

Upon decoding PDCCH and PHICH at D-subframe #10, the mobile station apparatus detects no uplink grant on PDCCH, and detects NACK on PHICH, then retransmits the uplink data. In this case, transmission is performed using the same MCS and the same resource blocks as those used at the previous transmission.

This retransmission process is called a Non-Adaptive HARQ. The timing of the retransmission process in the uplink is synchronized. In this example, retransmissions are performed at intervals of 8 U-subframes. That is, the round-trip time is 8 subframes.

FIG. 14 shows an uplink transmission procedure of Adaptive HARQ. The base station apparatus performs a decoding process of the uplink data, and transmits ACK in case that the CRC (Cyclic Redundancy Check) has succeeded and the uplink grant included with information for retransmission in case that the CRC has failed, in order to designate new MCS and resource blocks for retransmission.

The mobile station apparatus decodes on PDCCH at D-subframe #10, and retransmits the uplink data when the uplink grant has been detected on PDCCH. In this case, transmission is performed by using new MCS and resource blocks that are designated by using PDCCH. This retransmission process is called an Adaptive HARQ.

Further, non-patented document 2 proposes a method of transmitting the channel state information from the mobile station apparatus to the base station apparatus, in which the base station apparatus uses the uplink grant including information that designates transmission of the channel state information on PUSCH, in order to transmit the channel state information aperiodically (trigger-wise). The mobile station apparatus, having received the uplink grant including information that designates the transmission of the channel state information, transmits detailed channel state information by using the assigned resources, whereby flexible transmission and reception of the channel state information is realized between the base station apparatus and the mobile station apparatus.

Moreover, non-patented document 3 proposes a method of transmitting the channel state information from the mobile station apparatus to the base station apparatus, in which when the base station apparatus assigns resources on PUSCH, the channel state information is continuously transmitted so as to realize frequent the transmission of detailed channel state information without use of any special signaling.

Non-patented document 1: 3GPP TS (Technical Specification) 36.211, V1.10 (2007-05), Technical Specification Group Radio Access Network, Physical Channel and Modulation (Release 8)

Non-patented document 2: "CQI Trigger Mechanism", 3GPP TSG RAN WG1 Meeting #50bis, R1-074353, October 2007

Non-patented document 3: "Channel feedback format selection", 3GPP, TSG RAN WG1 Meeting #51, R1-974854, November 2007

DISCLOSURE OF INVENTION

Problems to be Solved by the Invention

However, in the related art, the mobile station apparatus could not know how to transmit the channel state information at the time of retransmitting the uplink data. That is, in case that the transmission data is retransmitted from the mobile station apparatus to the mobile station apparatus, the data identical to data previously transmitted is to be transmitted. Accordingly, the channel state information having been transmitted before retransmission is transmitted once again, so that it has been impossible to send information matching to the channel condition at the time of retransmission.

Further, when the uplink grant is transmitted from the base station apparatus as an aperiodic transmission request for the channel state information, it has been impossible to know how to transmit the channel state information by the subsequent retransmission resources.

Moreover, since the procedures of transmitting the channel state information by Non-Adaptive HARQ and Adaptive HARQ are not specified, it might occur that there is a discrepancy between the mobile station apparatus and the base station apparatus as to whether or not the channel state information is included.

The present invention has been devised in view of the above circumstances, it is therefore an object of the present invention to provide the mobile station apparatus that, when the mobile station apparatus is designated to retransmit, can transmit appropriate channel state information so that the base station apparatus can perform efficient communication control (scheduling) suitable for the current channel condition, between the base station apparatus and the mobile station apparatus.

Unit for Solving the Problems

In order to solve the above problem, a mobile station apparatus of the present invention includes: a transmission grant signal receiving unit for receiving, from a base station apparatus, a transmission grant signal for uplink data; and a transmitting unit for transmitting, to the base station apparatus, data in case that the transmission grant signal does not include a transmission request for the channel state information, the data and the channel state information in case that the transmission grant signal includes the transmission request for the channel state information, and the channel state information in case that the transmission grant signal includes the transmission request for the channel state information only, wherein it is determined that the data being transmitted to the base station apparatus has been successfully transmitted in case that the transmission grant signal includes the transmission request for the channel state information only.

A mobile station apparatus of the present invention includes: a transmission grant signal receiving unit for receiving, from a base station apparatus, a transmission grant signal for uplink data; a channel state information acquiring unit for acquiring channel state information; and, a data transmitting unit for transmitting an uplink transmission signal including the data to be transmitted to the base station and the channel state information in case that the transmission grant signal is received, and wherein, the data transmitting unit transmits the uplink transmission signal including the data having been transmitted to the base station and the channel state information that has been reacquired by the channel state information acquiring unit in case that the transmission grant signal is a signal that indicates retransmission of the data from the base station apparatus.

Further, the mobile station apparatus of the present invention further includes a reply signal receiving unit for receiving, from the base station apparatus, a reply signal, and characterized in that, in case that a negative reply is received by the reply signal receiving unit, the data transmitting unit transmits the uplink transmission signal including the data having been transmitted to the base station and the channel state information that has been reacquired by the channel state information acquiring unit.

The mobile station apparatus of the present invention is characterized in that, in case that a positive signal is received by the reply signal receiving unit, the data transmitting unit does not transmit any channel state information.

A mobile station apparatus of the present invention includes: a transmission grant signal receiving unit for receiving, from a base station apparatus, a transmission grant signal for uplink data; a channel state information acquiring unit for acquiring channel state information; and, a data transmitting unit which, when the transmission grant signal is received, transmits an uplink transmission signal included in the channel state information, wherein when the transmission grant signal is a signal that indicates transmission of the channel state information, the data transmitting unit transmits the channel state information reacquired by the channel state information acquiring unit and included in the uplink transmission signal.

The mobile station apparatus of the present invention further includes a reply signal receiving unit for receiving a reply signal from the base station apparatus, wherein, when a negative reply is received by the reply signal receiving unit, the data transmitting unit transmits the channel state information reacquired by the channel state information acquiring unit and included in the uplink transmission signal.

The mobile station apparatus of the present invention is characterized in that, in case that a positive signal is received by the reply signal receiving unit, the data transmitting unit does not included the channel state information into the uplink transmission signal.

A program of the present invention is one for computer connected to a base station apparatus, the program comprises computer executable functions for: receiving, from a base station apparatus, a transmission grant signal for uplink data; and transmitting, to the base station apparatus, data in case that the transmission grant signal does not include a transmission request for the channel state information, the data and the channel state information in case that the transmission grant signal includes the transmission request for the channel state information, and the channel state information in case that the transmission grant signal includes the transmission request for the channel state information only; and determining that the data being transmitted to the base station apparatus has been successfully transmitted in case that the transmission grant signal includes the transmission request for the channel state information only.

A program of the present invention is one for computer connected to a base station apparatus, the program comprises computer executable functions for: receiving, from a base station apparatus, a transmission grant signal for uplink data; acquiring channel state information; transmitting an uplink transmission signal including the data to be transmitted to the base station and the channel state information in case that the transmission grant signal is received; and transmitting the uplink transmission signal including the data having been transmitted to the base station and the channel state information that has been reacquired by the channel state information acquiring unit in case that the transmission grant signal is a signal that indicates the retransmission of the data from the base station apparatus.

A program of the present invention is one for computer connected to a base station apparatus, the program comprises computer executable functions for: receiving, from a base station apparatus, a transmission grant signal for uplink data; acquiring channel state information; transmitting the channel state information included in the uplink transmission signal in case that the transmission grant signal is received; and transmitting the channel state information reacquired by the channel state information acquiring unit and included in the uplink transmission signal in case that the transmission grant signal is a signal that indicates transmission of the channel state information.

Effect of the Invention

According to the present invention, the mobile station apparatus receives, from the base station apparatus, a transmission grant signal for uplink data and acquires channel state information. Then, in case that receiving the transmission grant signal, the mobile station apparatus transmits as an uplink transmission signal including the data to be transmitted to the base station and the channel state information. In this case, if the transmission grant signal is a signal that indicates the retransmission of the data from the base station apparatus, the mobile station apparatus will transmit as the uplink transmission signal including the data that has been transmitted to the base station and reacquired channel state information. Accordingly, when designated to retransmit, the mobile station apparatus is able to transmit the channel state information efficiently, and the base station apparatus can perform efficient communication control (scheduling) suitable for the current channel condition, between the base station apparatus and the mobile station apparatus.

DESCRIPTION OF REFERENCE NUMERALS

1 Base station apparatus
  100 Data controller
  102 OFDM modulator
  104 Transceiver
  106 Scheduler
    1062 DL scheduler
    1064 UL scheduler
    1066 Control data generator
  108 Channel estimator
  110 DTF-s-OFDM demodulator
  112 Data extractor
5 Mobile station apparatus
  500 Data controller
  502 DFT-s-OFDM modulator
  504 Transceiver
  506 Scheduler
    5062 Control data analyzer
    5064 Control data generator
    5066 UL scheduler
  508 Channel estimator
  510 OFDM demodulator
  512 Data extractor

BEST MODE FOR CARRYING OUT THE INVENTION

Figure 1:
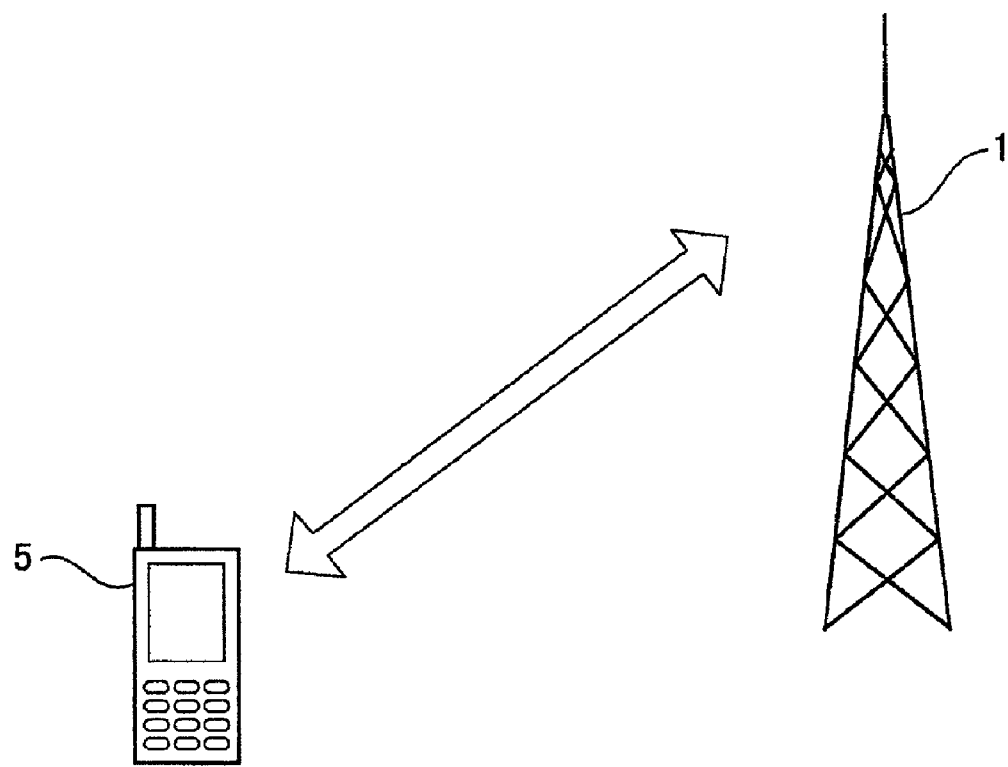
FIG. 1 is a diagram showing the outline of a communication system when the present invention is applied.

Next, the best mode for carrying out the present invention will be described with reference to the drawings. To being with, FIG. 1 shows the outline of a communication system including a base station apparatus and a mobile station apparatus in case that the present invention is applied. The present embodiment will be described on the assumption that a base station apparatus 1 communicates with a mobile station apparatus 5. It is also assumed that the base station apparatus 1 and the mobile station apparatus 5 are connected to each other by means of a mobile communication network system using EUTRA.

Figure 2:
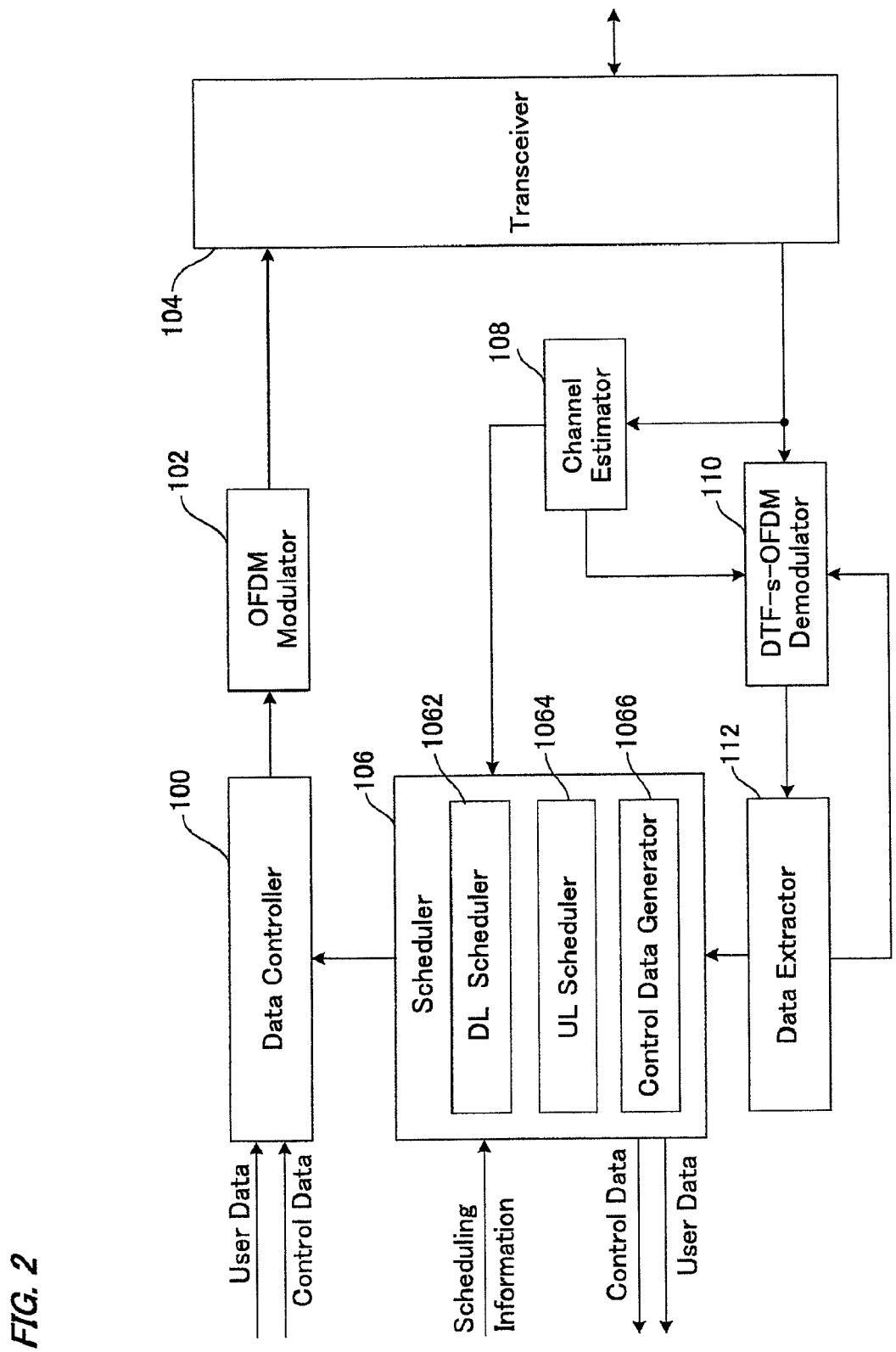
FIG. 2 is a diagram showing the configuration of a base station apparatus in the present embodiment.

FIG. 2 is a block diagram showing a schematic configuration of the base station apparatus 1 according to the present invention. The base station apparatus 1 includes a data controller 100, an OFDM modulator 102, a transceiver 104, a scheduler 106, a channel estimator 108, a DFT-s-OFDM demodulator 110 and a data extractor 112.

Under instructions from the scheduler 106, the data controller 100 maps control data onto a downlink control channel PDCCH, a downlink synchronization channel PSCH, a downlink pilot channel DPiCH and a downlink broadcasting channel PBCH, and maps the user data for each mobile station apparatus and other control data onto a downlink shared channel PDSCH.

The OFDM modulator 102, based on the input signals from the data controller 100, performs data modulation, serial/parallel conversion of the input signals, and OFDM signal processes such as IFFT (Inverse Fast Fourier transform) transform, CP (Cyclic Prefix) insertion, filtering and the like, to generate OFDM signals. The produced OFDM signals are output to transceiver 104.

The transceiver 104 upconverts the input data from the OFDM modulator 102 into a radio frequency and transmits the data to the mobile station apparatus 5. The transceiver 104 also receives the uplink data from the mobile station apparatus 5 and downconverts the received data to base band signals and outputs the signals to the channel estimator 108 and the DFT-s-OFDM demodulator 110.

The scheduler 106 provides the function of MAC layer (Medium Access Control), and includes a DL scheduler 1062 for performing downlink scheduling, a UL scheduler 1064 for performing uplink scheduling and a control data generator 1066. The scheduler also notifies the data controller 100 of scheduling information. Further, the scheduler outputs the received user data and control data received from the data extractor 112 to the upper layer for processing.

The DL scheduler 1062 is a functional unit that makes a schedule for mapping user data and control data onto each of the downlink channels, based on the channel state information notified from the mobile station apparatus 5, ACK/NACK information of downlink data, data information on each user notified from the upper layer, the control data generated by the control data generator 1066 and the like.

The UL scheduler 1064 is a functional unit that makes a schedule for mapping user data onto each of the uplink channels, based on the channel estimated result of the uplink from the channel estimator 108 and the resource assignment request from the mobile station apparatus 5.

The control data generator 1066 generates an ACK/NACK signal as control data in order to perform feedback control of the valid or invalid sense of the uplink received data input from the data extractor 112 and the channel state information.

The generator also generates as control data, scheduling information created by the DL scheduler 1062 and the UL scheduler 1064.

The channel estimator 108 is a functional unit that performs channel estimation from the demodulate RS (Reference Symbol) of the uplink pilot channel UPiCH and outputs the channel estimated result to the DTF-s-OFDM demodulator 110. The estimator also outputs the channel estimated result to the scheduler 106 in order to make a schedule of the uplink from the sounding RS of the uplink pilot channel UPiCH. Here, the uplink communication scheme is presumed to be a single carrier scheme such as DFT-spred-OFDM or the like, but a multi-carrier scheme such as an OFDM scheme may be used.

The DFT-s-OFDM demodulator 110 is a functional unit that demodulates data signals, based on the input DFT-Spread-OFDM signals, through DFT-s-OFDM signal process, which includes DFT transform, sub-carrier mapping, IFFT transform, filtering and the like.

The data extractor 112 is a functional unit that checks the valid or invalid sense of the received data and notifies the scheduler 106 of the check result. The extractor also separates the received data into user data and control data and outputs the data to the scheduler 106. The received data is stored in order to be combined with the retransmission data, so that the data is combined when the retransmission data is received.

Figure 3:
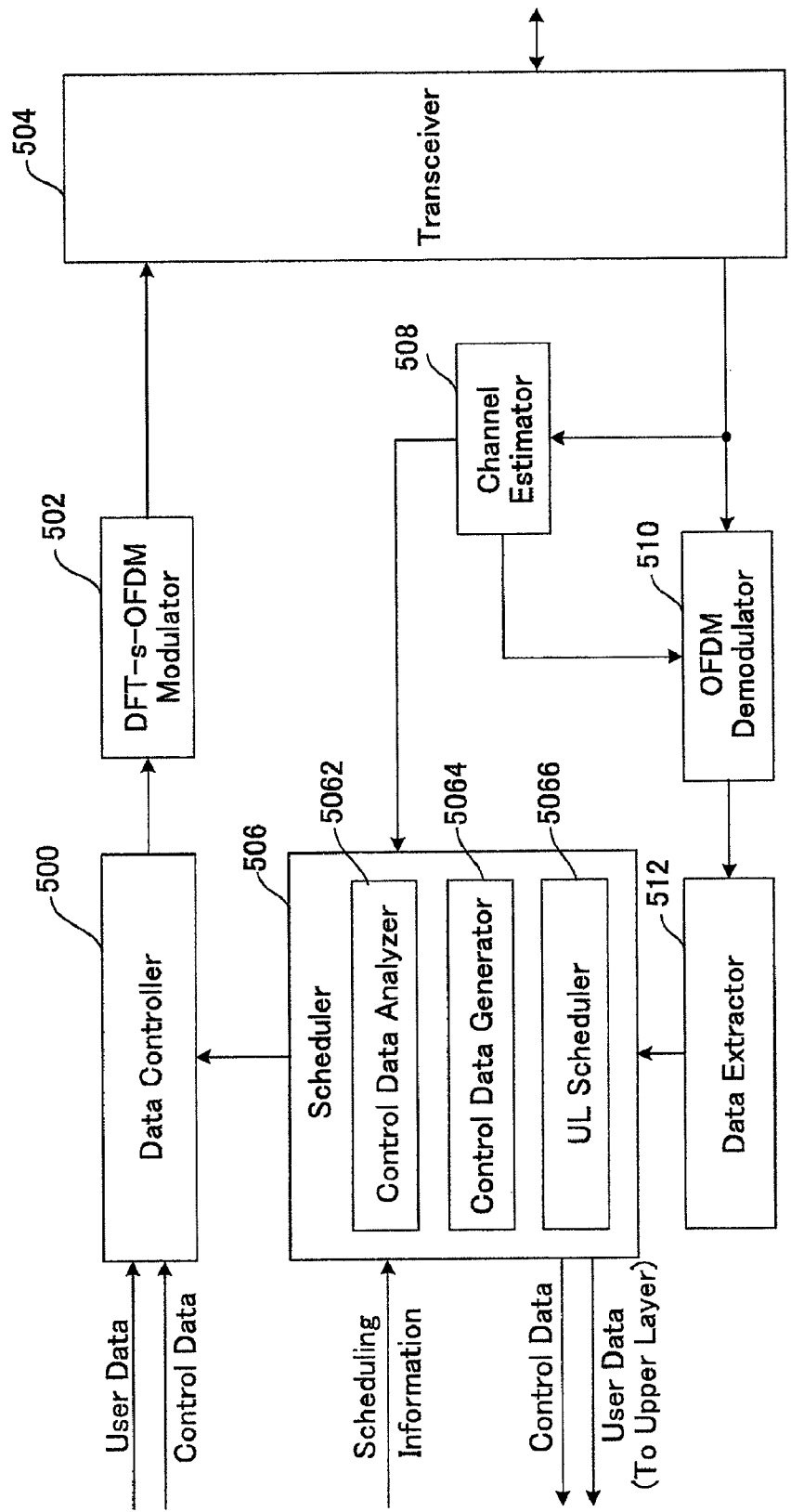
FIG. 3 is a diagram showing the configuration of a mobile station apparatus in the present embodiment.

Referring next to FIG. 3, the configuration of the mobile station apparatus 5 will be described. The mobile station apparatus 5 includes a data controller 500, a DFT-s-OFDM modulator 502, a transceiver 504, a scheduler 506, a channel estimator 508, an OFDM demodulator 510 and a data extractor 512.

The data controller 500 is mapped so that user data and control data input from the upper layer or the scheduler 506 will be transmit through the uplink shared channel PUSCH and the uplink control channel PUCCH on the instructions of the scheduler 506. Moreover, sounding RS and demodulated RS are mapped on the uplink pilot channel UPiCH.

The DFT-s-OFDM modulator 502 performs data modulation, and DFT-s-OFDM signal processing such as DFT transform, sub-carrier mapping, IFFT transform, CP (Cyclic Prefix) insertion, filtering and the like to generate DFT-Spread-OFDM signals. In case that control data (ACK/NACK or channel state information) is transmitted on the uplink shared channel PUSCH, the control data is multiplexed with user data (transport blocks for uplink transmission (uplink data) input from the MAC layer or the upper layer).

The control data and the uplink data on the uplink shared channel PUSCH are multiplexed at the level of modulation symbols, and transformed by DFT. A signal in which the control data and the uplink data are multiplexed and transmitted on PUSCH is called the uplink transmission signal. On the base station apparatus side, the uplink transmission signal can be separated at the level of modulation symbols. Accordingly, as a retransmission process is applied to the user data only, so newly measured data can be mapped as the control data. The uplink communication scheme is presumed to be a single carrier scheme such as DFT-spred-OFDM, but a multi-carrier scheme such as an OFDM scheme may also be used.

The transceiver 504 sets up a radio frequency indicated by a radio controller (not shown), upconverts the signal input from the DFT-s-OFDM modulator 502 to the radio frequency and transmits the signal to the base station apparatus 1. Moreover, the transceiver 504 receives the downlink data from the base station apparatus 1, downconverts the data into baseband signals and outputs the received data to the channel estimator 508 and the OFDM demodulator 510.

The scheduler 506 provides the function of the MAC layer (the Medium Access Control), and includes a control data analyzer 5062, a control data generator 5064 and a UL scheduler 5066. The scheduler also notifies the data controller 500 of scheduling information. The received user data and control data from the data extractor 512 are processed or output to the upper layer.

The control data analyzer 5062 analyzes the control information input from the data extractor 512 and outputs the scheduling information input from the upper layer to the UL scheduler 5066.

The control data generator 5064 generates ACK signals, NACK signals and other control data, and outputs these signals and data to the data controller 500.

Further, the UL scheduler 5066 controls the resources that map on PUSCH and the uplink control channel PUCCH based on the scheduling information.

The channel estimator 508 is a functional unit that performs channel estimation from the downlink pilot channel DPiCH and outputs the estimated result to the OFDM demodulator 510. The estimator converts the result into the channel state information for notifying the base station apparatus 1 of the channel estimated result and output the channel state information to the scheduler 506.

The OFDM demodulator 510 is a functional unit that performs OFDM demodulation of the received data input from the transceiver 504, based on the channel estimated result from the channel estimator 508.

The data extractor 512 is a functional unit that checks valid or invalid sense of the received data received data input from the OFDM demodulator 510 and notifies the scheduler 506 of the check result. The extractor also separates the received data into user data and control data and outputs the data to the scheduler 506. Further, the received data is stored in order to be combined with the retransmission data, so that the data is combined at the time of receiving the retransmission data.

[The first embodiment]

Next, the first embodiment will be described in a communication system using the base station apparatus 1 and the mobile station apparatus 5. The mobile station apparatus 5 transmits channel state information to the base station apparatus 1. The base station apparatus 1, based on the channel state information, determines the communication condition with the mobile station apparatus 5 and establishes a communication channel.

First, the channel state information is made up of CQI, PMI, RI and the like. The number of bits and formats of these pieces of channel state information are designated to the mobile station apparatus 5 by the base station apparatus 1, depending on the circumstances. These settings are designated from the base station apparatus 1 to the mobile station apparatus 5 by using a RRC signaling (Radio Resource Control Signaling).

Further, in case of transmitting the data on PUSCH to the base station apparatus 1, the mobile station apparatus 5 is set to transmit the data included with the channel state information. Accordingly, the periodic transmission of the channel state information can be realized. There may exist a subframe at which the transmission of the channel state information is prohibited, depending on the position of the subframe. These settings are designated to the mobile station apparatus 5 by the base station apparatus 1 by using the RRC signaling (Radio Resource Control Signaling).

In case that the uplink grant transmitted from the base station apparatus 1 to the mobile station apparatus 5 takes a special value, the channel state information only will be transmitted with no uplink data transmitted. This uplink grant with a special value is called the uplink grant including a transmission request dedicated for the channel state information.

Figure 4:
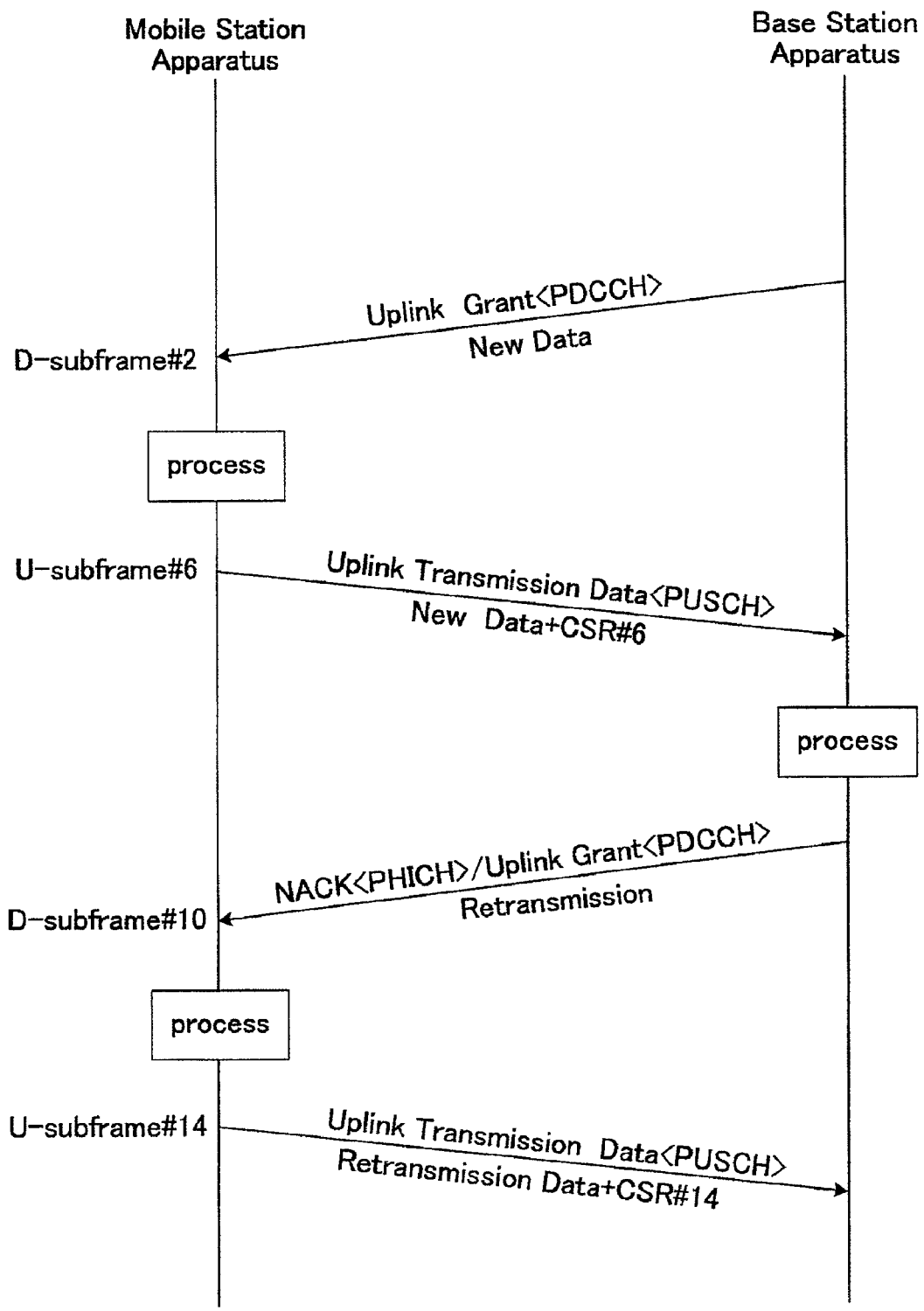
FIG. 4 is a diagram for illustrating communication procedures in the first embodiment.

FIG. 4 shows the procedure of transmitting the channel state information according to the first embodiment. The mobile station apparatus 5 decodes on PDCCH at D-subframe #2 and detects the uplink transmission grant signal (the uplink grant) to the mobile station apparatus 5. This uplink grant includes a new data indicator indicating new data.

The mobile station apparatus 5, at uplink subframe U-subframe #6 after a fixed processing time associated with D-subframe #2, transmits new data and newly measured channel state information (CSR#6) as the uplink transmission signal on PUSCH.

The base station apparatus 1 performs a decoding process of the uplink transmission signal, and transmits ACK in case that CRC (Cyclic Redundancy Check) in the uplink data has succeeded.

However, in case that the CRC (Cyclic Redundancy Check) has failed, the base station apparatus 1 transmits NACK to the mobile station apparatus 5 by using PHICH, or transmits the uplink grant that includes no new data indicator for designating new MCS and resource blocks for retransmission, to the mobile station apparatus 5 by using PDCCH. At this point, the base station apparatus 1 decodes the received channel state information (CSR) and reflects the result in downlink scheduling.

The mobile station apparatus 5 decodes on PDCCH or PHICH at D-subframe #10. And then, in case of detecting the uplink grant which includes no new data indicator on PDCCH or detecting NACK which is a negative reply as a reply signal on PHICH, the mobile station apparatus 5 retransmits the data.

Specifically, the mobile station apparatus 5 transmits HARQ retransmission data corresponding to the previously transmitted data (the new data transmitted at U-subframe #6) to the base station apparatus 1. The new data and the retransmission data are generated from the same transport block at the mobile station apparatus 5 and combined at the base station apparatus 1.

In this case, the retransmission data and the channel state information are transmitted on PUSCH. The channel state information to be transmitted is one (CSR#14) that is newly measured after detection of retransmission at D-subframe #10.

With this scheme, it becomes possible to feedback the channel state information at regular intervals (round-trip time for HARQ) thanks to the properties of synchronous HARQ.

Figure 5:
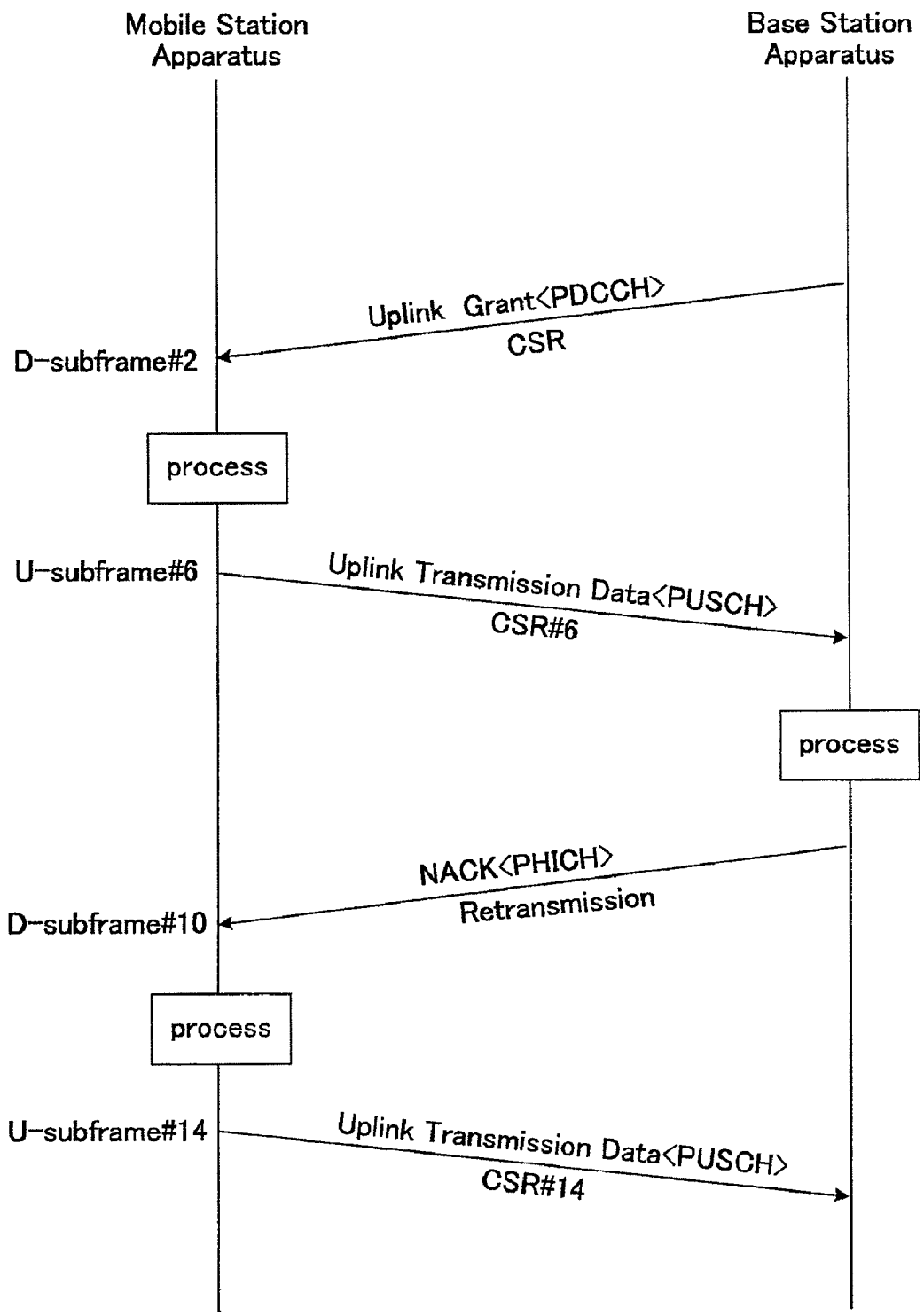
FIG. 5 is a diagram for illustrating communication procedures in the first embodiment.

Subsequently, FIG. 5 shows the procedure for transmitting the channel state information only. The mobile station apparatus 5 decodes on PDCCH at D-subframe #2 and detects the uplink transmission grant signal (the uplink grant) to the mobile station apparatus 5. This uplink grant includes information (the transmission request dedicated for the channel state information) which designates to transmit the channel state information without transmitting the uplink data.

The mobile station apparatus 5, at uplink subframe U-subframe #6 after a fixed processing time associated with D-subframe #2, transmits newly measured channel state information (CSR#6) as the uplink transmission signal on PUSCH.

The base station apparatus 1 decodes received the channel state information (CSR) and reflects the result for downlink scheduling. The base station apparatus 1, by using PHICH, transmits NACK (negative reply) in case of making a further request for the channel state information, or transmits ACK (positive reply) in case of making no request for the channel state information.

In case that the mobile station apparatus 5 decodes on PDCCH and PHICH at D-subframe #10 and detects no uplink grant on PDCCH and detects NACK on PHICH, the mobile station apparatus 5 transmits newly measured channel state information (CSR#14). When detecting no uplink grant on PDCCH and detecting ACK on PHICH, the mobile station apparatus stops the transmission of the channel state information.

With this scheme, it becomes possible to stop feedback of the channel state information or perform continuous feedback, by using ACK/NACK on PHICH only, hence it is possible to reduce PDCCH overhead. Further, it is possible to feed back the channel state information at regular intervals (round-trip time for HARQ) thanks to the properties of synchronous HARQ.

Figure 6:
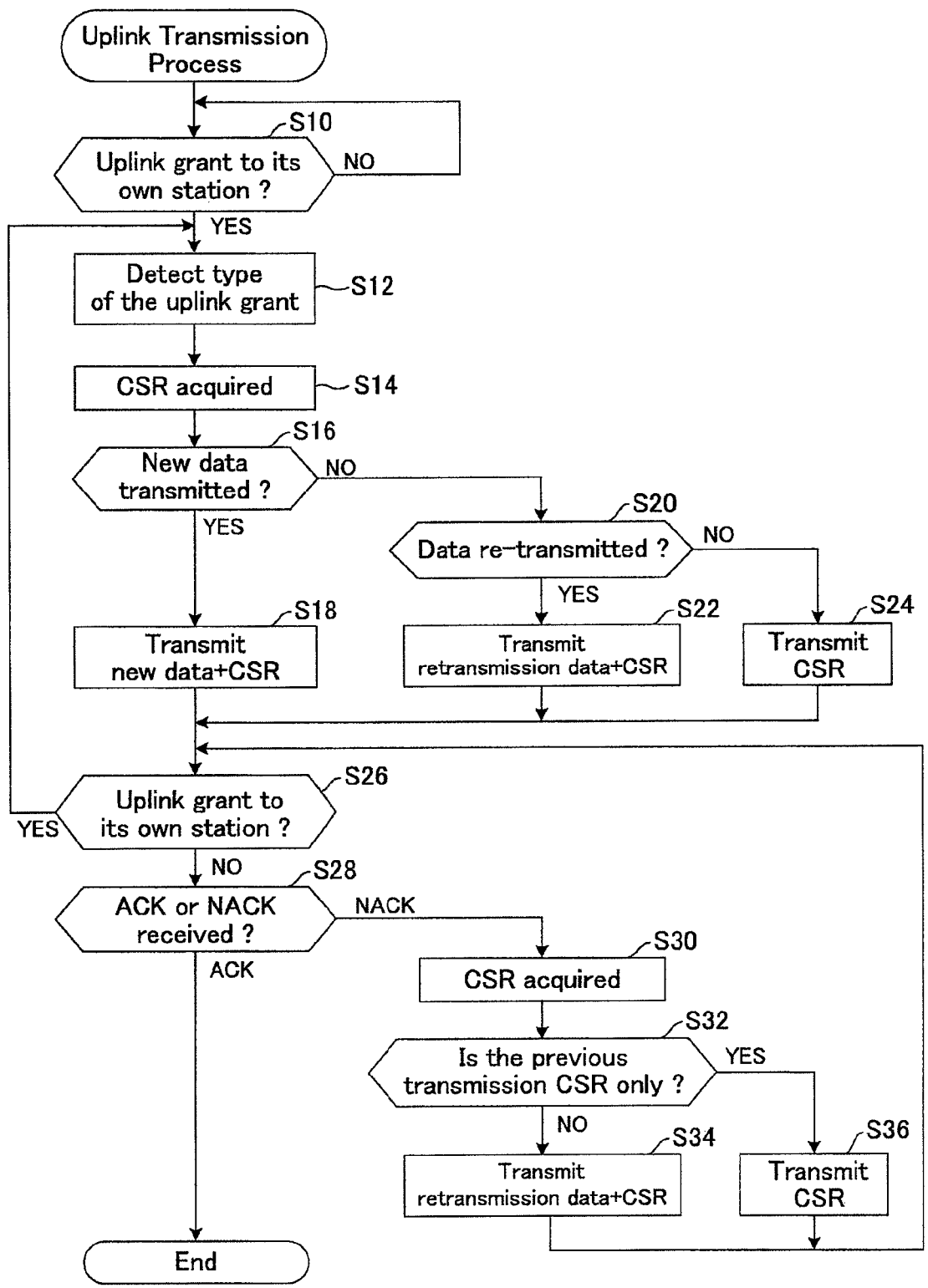
FIG. 6 is an operational flow for illustrating the flow of the process at a mobile station apparatus in the first embodiment.

Now, the processing sequence of the mobile station apparatus 5 in the first embodiment will be described with reference to FIG. 6. First, the mobile station apparatus 5 decodes on PDCCH so as to check whether there is any uplink grant to the station of its own (Step S10).

In case that the mobile station apparatus 5 has detected the uplink grant to the station of its own (Step S10; Yes), the mobile station apparatus 5 analyzes the uplink grant to detect a type of the uplink grant (Step S12). The type of the uplink grant herein represents whether the grant indicates the transmission of new data, the transmission of the retransmission data, or the transmission of the channel state information (CSR: Channel State Report) only. Whether the grant indicates the transmission of the channel state information only is determined based on whether the transmission request dedicated for the channel state information is included. Whether the grant indicates new data or the retransmission data is determined based on the presence of the new data indicator. This information is stored as the type of the uplink grant.

Subsequently, the channel state information (CSR) is acquired (Step S14). Specifically, the channel state information is measured at the channel estimator 508. Specifically, the channel estimator 508 can measure the channel state by extracting reference signals from among the downlink information transmitted from the base station apparatus. This reference signal is transmitted on the downlink pilot channel DPiCH (Downlink Pilot Channel).

This reference signal is a signal that has been determined before hand between the base station apparatus 1 and the mobile station apparatus 5. The mobile station apparatus 5 measures the channel state by measuring how this reference signal deviates from the predetermined value. Further, the reference signal is defined with the antenna from which the signal is transmitted, so as to be able to measure the channel state for every antenna. Based on these reference signals, the channel quality, frequency domains of high channel quality, the number of streams at the time of the MIMO transmission and precoding information are calculated and coded as CQI, frequency domains indicator, RI and PHI.

As an example, CQI is expressed as the MCS that can achieve 10% or less of bit error in case that the downlink transmission is performed based on the MCS. One or plural formats of the channel state information including these pieces of information are set by the RRC signaling (Radio Resource Control Signaling).

Then, the mobile station apparatus 5 acquires the channel state information measured at the channel estimator 508.

Here, the channel state information may be acquired by the channel estimator 508 at each time at the acquisition stage at Step S14, or the channel estimator 508 may measure the channel state continuously and acquire the channel state information as required.

In case that the type of the uplink grant is the transmission of new data (Step S16; Yes), the mobile station apparatus 5 transmits new data to be transmitted and the CSR that has been acquired at Step S14 to the base station apparatus 1 (Step S16). It should be noted that the mobile station apparatus 5 will not transmit the CSR at the subframe at which the transmission of the CSR is prohibited.

In case that the type of the uplink grant is the retransmission data (Step S16; No->Step S20; Yes), the mobile station apparatus 5 transmits the retransmission data and the CSR that has been acquired at Step S14 (Step S22). Accordingly, the CSR at the time of transmitting the retransmission data is transmitted and the same CSR before retransmission will not be transmitted. It should be noted that the mobile station apparatus 5 will not transmit the CSR at the subframe at which the transmission of the CSR is prohibited.

In case that the type of the uplink grant is the CSR only (Step S16; No->Step S20; No), the mobile station apparatus 5 transmits no data, but transmits the CSR that has been acquired at Step S14.

Here, In case that the type of the uplink grant used at the previous transmission is not the CSR only (that is, new data or the retransmission data) and the type of the uplink grant newly detected is the CSR only, the mobile station apparatus 5 determines that the previous transmission has succeeded (the CRC on the base station apparatus 1 side has succeeded), and flushes the buffer for the uplink transmission and writes new data and reports ACK from the scheduler (the MAC layer) to the upper layer.

When the mobile station apparatus 5 completes the transmission, and then detects the uplink grant to the station of its own on PDCCH at a timing position associated with the uplink transmission (Step S26; Yes), the operation returns to the step of detecting the type of the uplink grant (Step S12).

In case that no uplink grant is detected on PDCCH (Step S26; No), it is detected whether or not PHICH includes ACK or NACK (Step S28). Here, in case that ACK has been received (Step S28; ACK), the mobile station apparatus 5 ends the current process.

In case that NACK has been received (Step S28; NACK), the mobile station apparatus 5 acquires the CSR from the channel estimator 508 (Step S30).

Here, the type of the uplink grant previously received is checked so as to determine whether or not the one previously transmitted is the CSR only (Step S32). Here, in case that the previous transmission is the CSR only (Step S32; Yes), the mobile station apparatus transmits the CSR that has been acquired at Step S30 without transmitting the data (Step S36). On the other hand, in case that the previous transmission includes the data (Step S32; No), the mobile station apparatus transmits the previously transmitted data as the retransmission data with the CSR that has been acquired at Step S30 to the base station apparatus 1 (Step S34).

Then, the operation enters a PDCCH or PHICH receiving process (i.e., Non-Adaptive HARQ). However, it should be noted that the mobile station apparatus 5 will not transmit the CSR at the subframe at which the transmission of the CSR is prohibited.

Further, this process can be executed in parallel in the number of the HARQ processes. The above processing is described referring to one synchronous HARQ process only. One synchronous HARQ process operates every time eight subframes are transmitted, and another synchronous HARQ process is operated for the following subframes.

In this way, according to the first embodiment, it is possible for the mobile station apparatus 5 to suitably transmit the channel state information at the timing of the data transmission. The base station apparatus 1 is made possible to perform scheduling based on the suitable state of communication with the mobile station apparatus 5.

Here, as a variational example, the format of the CSR may be designated by the uplink grant. Moreover, in this case, the mobile station apparatus 5 determines, depending on the type of the uplink grant, whether new data is transmitted, whether the retransmission data is transmitted, whether the CSR is transmitted, and whether the transmission is performed in CSR format 1 or in CSR format 2.

Accordingly, in case that the uplink grant previously transmitted takes a special value, this indicates that the CSR format 2 is designated, further, in retransmission resources, the newly measured CSR is transmitted while maintaining the CSR format 2. For example, the CRS format 1 is a periodic report format, and the CSR format 2 is an aperiodic report format. In this case, the type of the uplink grant of the CSR format 2 indicates an aperiodic report transmission request, and the mobile station apparatus makes a judgment based on whether the uplink grant includes the aperiodic report transmission request.

[The second embodiment]

Next, the second embodiment will be described. In the second embodiment, the process of a case including the transmission request dedicated for the channel state will be described.

Accordingly, when data is transmitted on PUSCH, the transmission is basically set up so that the channel state information is not included. In case that the channel state information is transmitted on PUSCH, the transmission request for the channel state information is included in the uplink grant. In this case, the transmission of the channel state information on PUSCH is generated trigger-wise (aperiodically). In case that the transmission request for the channel state information is included, both the uplink data and the channel state information are transmitted. However, in case that the uplink grant takes a special value, the channel state information only will be transmitted without transmitting the uplink data. This uplink grant with a special value is called the uplink grant including the transmission request dedicated for the channel state information.

Figure 7:
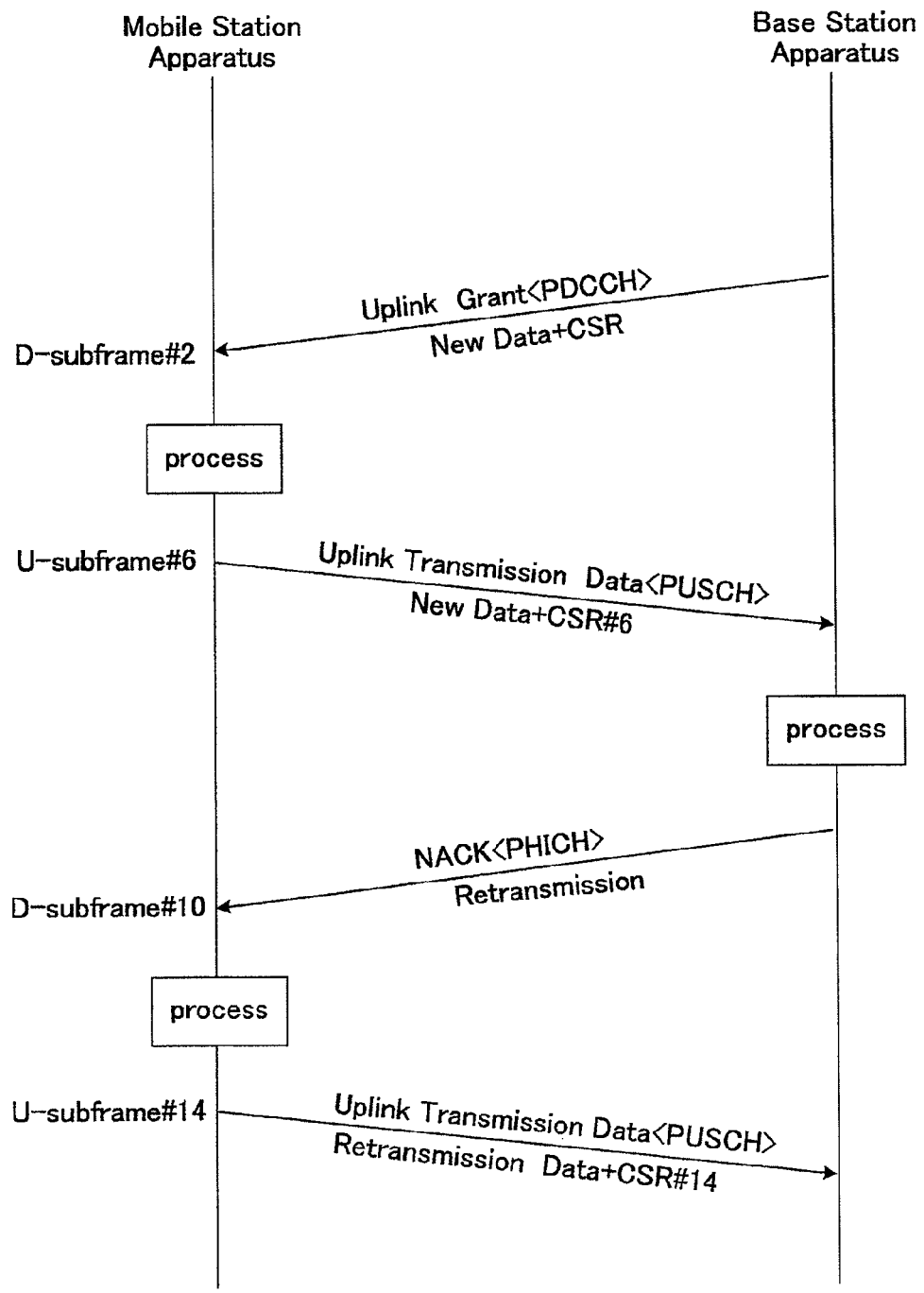
FIG. 7 is a diagram for illustrating communication procedures in the second embodiment.

FIG. 7 shows one example of the procedure of transmitting the channel state information. The mobile station apparatus 5 decodes on PDCCH at D-subframe #2 and detects the uplink transmission grant signal (the uplink grant) to the mobile station apparatus. This uplink grant includes the new data indicator indicating new data and the transmission request for the channel state information.

The mobile station apparatus 5, by using PUSCH at uplink subframe U-subframe #6 after a fixed processing time associated with D-subframe #2, transmits the uplink data (new data) and newly measured channel state information (CSR#6). The base station apparatus 1 performs a decoding process of the uplink data, and transmits ACK in case that the CRC (Cyclic Redundancy Check) has succeeded.

In case that the CRC (Cyclic Redundancy Check) has failed, the base station apparatus 1 transmits NACK to the mobile station apparatus 5 by using PHICH or transmits the uplink grant that includes no new data indicator for designating new MCS and resource blocks for retransmission, to the mobile station apparatus by using PDCCH.

In FIG. 7, the base station apparatus 1 transmits NACK to the mobile station apparatus 5 by using PHICH. In case of detecting no uplink grant on PDCCH and detecting NACK on PHICH at D-subframe #10, the mobile station apparatus 5 transmits the retransmission data and newly measured channel state information (CSR#14) as the uplink transmission signal. Here, the mobile station apparatus 5 transmits the channel state information because the channel state information was transmitted at the previous transmission. However, if no channel state information was transmitted at the previous transmission, the retransmission data only is transmitted.

In this way, according to the processing procedure in FIG. 7, it becomes possible to either stop feedback of the channel state information or perform continuous feedback based on ACK/NACK on PHICH only, hence it is possible to reduce PDCCH overhead. Further, it is possible to feed back the channel state information at regular intervals (round-trip time for HARQ) thanks to the properties of synchronous HARQ.

Figure 8:
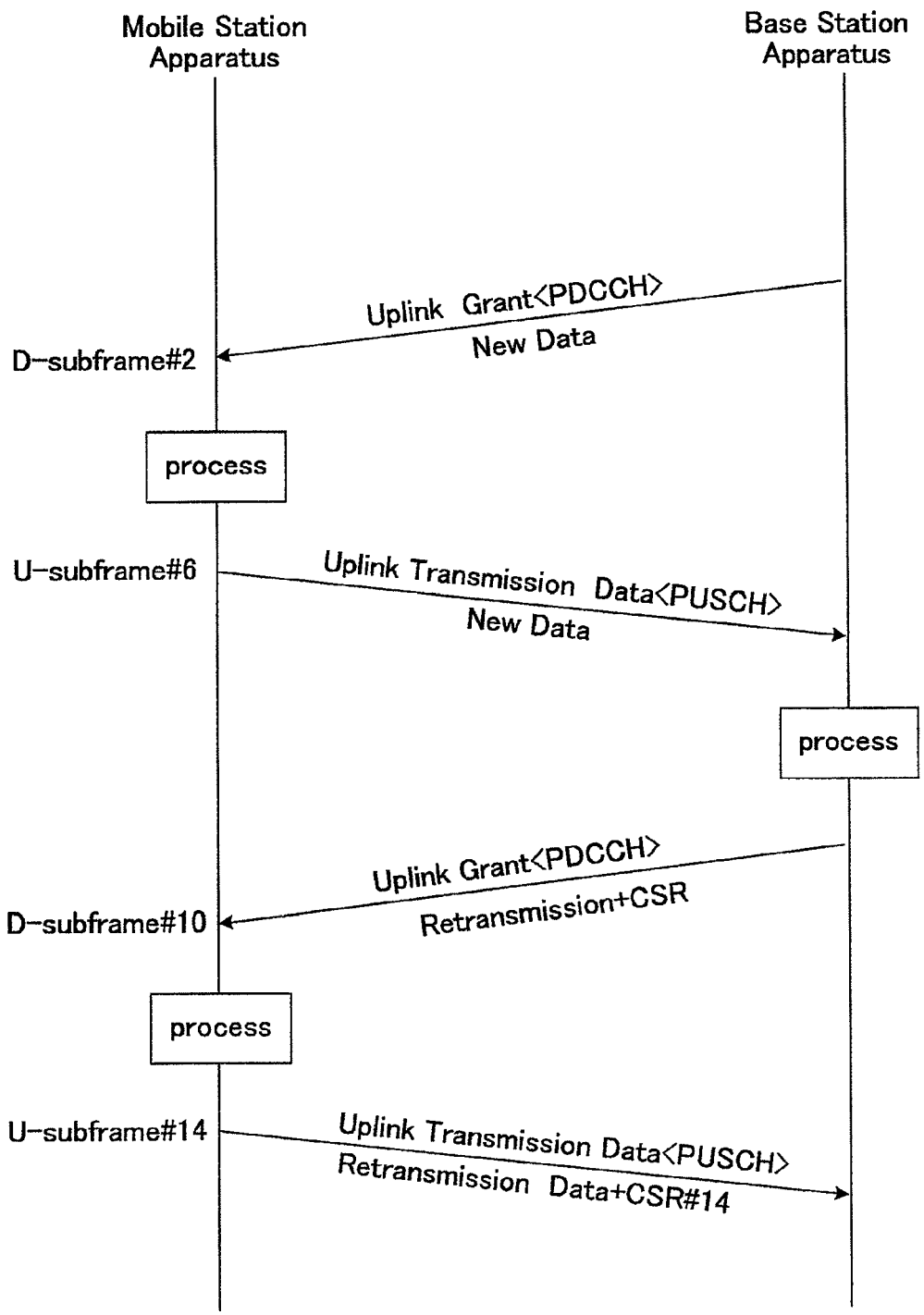
FIG. 8 is a diagram for illustrating communication procedures in the second embodiment.

Next, FIG. 8 shows an example of another procedure of transmitting the channel state information. The mobile station apparatus 5 decodes on PDCCH at D-subframe #2 and detects the uplink transmission grant signal (the uplink grant) to the mobile station apparatus 5. This uplink grant includes the new data indicator indicating new data, but does not include the transmission request for the channel state information (CSR).

The mobile station apparatus 5, by using PUSCH at uplink subframe U-subframe #6 after a fixed processing time associated with D-subframe #2, transmits new data as the uplink transmission signal. The base station apparatus 1 performs a decoding process of the uplink data, and transmits ACK in case that the CRC (Cyclic Redundancy Check) has succeeded.

In case that the CRC (Cyclic Redundancy Check) has failed, the base station apparatus 1 transmits NACK as a negative reply to the mobile station apparatus 5 by using PHICH or transmits the uplink grant that includes no new data indicator for designating new MCS and resource blocks for retransmission, to the mobile station apparatus 5 by using PDCCH. In FIG. 8, the base station apparatus 1 includes the transmission request for the channel state information (CSR) in the uplink grant in order to request the mobile station apparatus 5 to feed back the channel state information.

The mobile station apparatus 5 decodes the uplink grant, that includes the transmission request for the channel state information and does not include the new data indicator, on PDCCH at D-subframe #10. Since the uplink grant includes the transmission request for the channel state information, the mobile station apparatus transmits the retransmission data and the channel state information (CSR#14) that is newly measured at the time of retransmission, as the uplink transmission signal.

According to the processing procedure shown in FIG. 8, it becomes possible to continuously feedback the channel state information (CRS) at the time of the retransmission of the uplink data, hence schedule feedback of the channel state information in a more flexible manner. As a result, it is possible to reduce PDCCH overhead.

Figure 9:
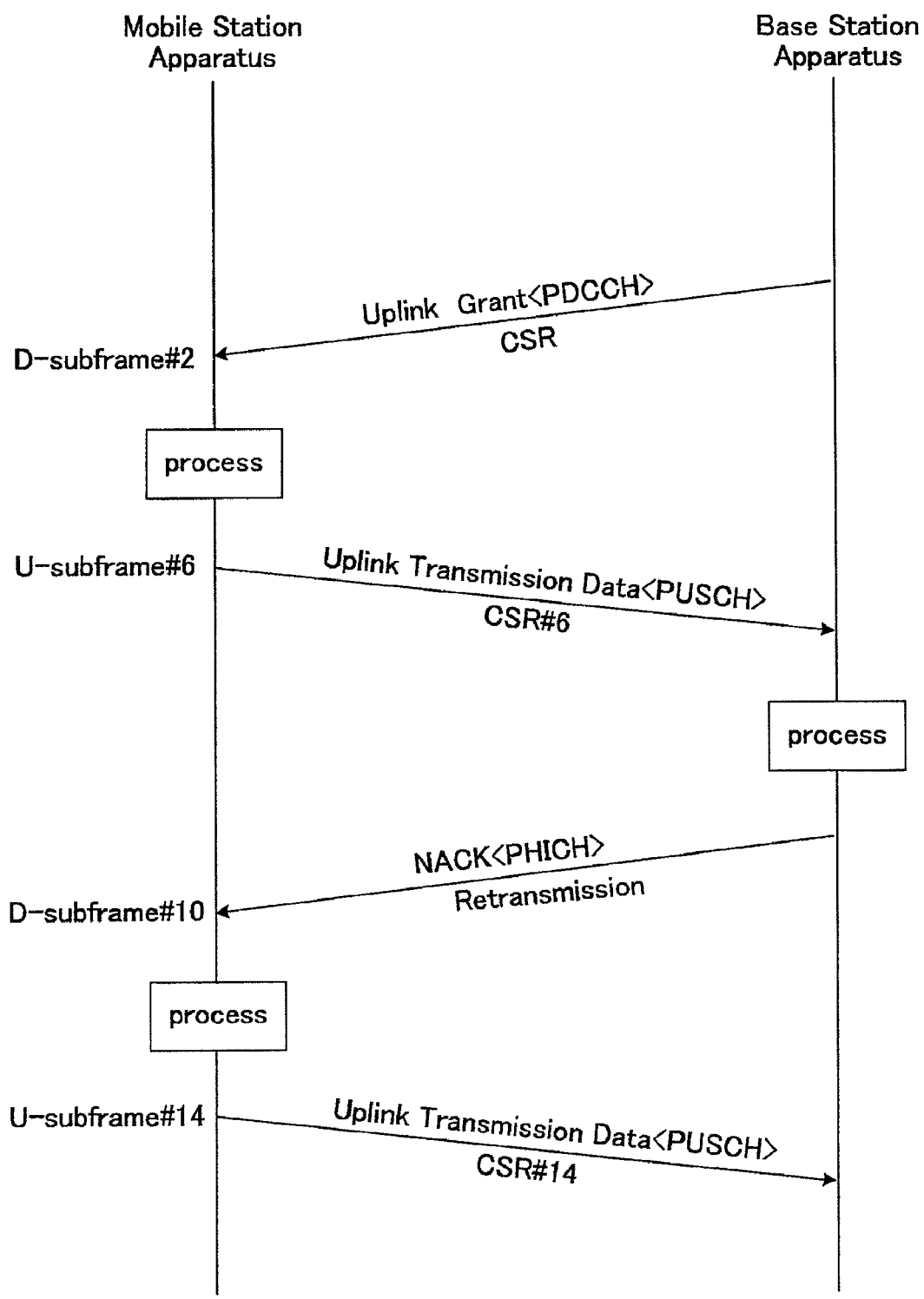
FIG. 9 is a diagram for illustrating communication procedures in the second embodiment.

Next, FIG. 9 shows an example of another procedure for transmitting the channel state information. The mobile station apparatus 5 decodes on PDCCH at D-subframe #2 and detects the uplink transmission grant signal (the uplink grant) to the mobile station apparatus 5. This uplink grant includes information (the transmission request dedicated for the channel state information) to designate to transmit the channel state information without transmitting the uplink data.

The mobile station apparatus 5, by using PUSCH at uplink subframe U-subframe #6 after a fixed processing time associated with D-subframe #2, transmits newly measured channel state information (CSR#6) without transmitting the uplink data.

The base station apparatus 1 decodes the received channel state information and reflects the result for downlink scheduling. The base station apparatus 1, by using PHICH, transmits NACK, a negative reply in case of making a further request for the channel state information or transmits ACK, a positive reply in case of making no request for the channel state information.

In case that the mobile station apparatus 5 detects no uplink grant on PDCCH and detects NACK on PHICH at D-subframe #10, the mobile station apparatus transmits newly measured channel state information (CSR#14). On the other hand, in case of detecting no uplink grant on PDCCH and detecting ACK on PHICH, the mobile station apparatus stops the transmission of the channel state information.

In this way, it becomes possible to either stop feedback of the channel state information or perform continuous feedback based on ACK/NACK on PHICH only, hence it is possible to reduce PDCCH overhead. Further, it is possible to feed back the channel state information at regular intervals (round-trip time for HARQ) thanks to the properties of synchronous HARQ.

Figure 10:
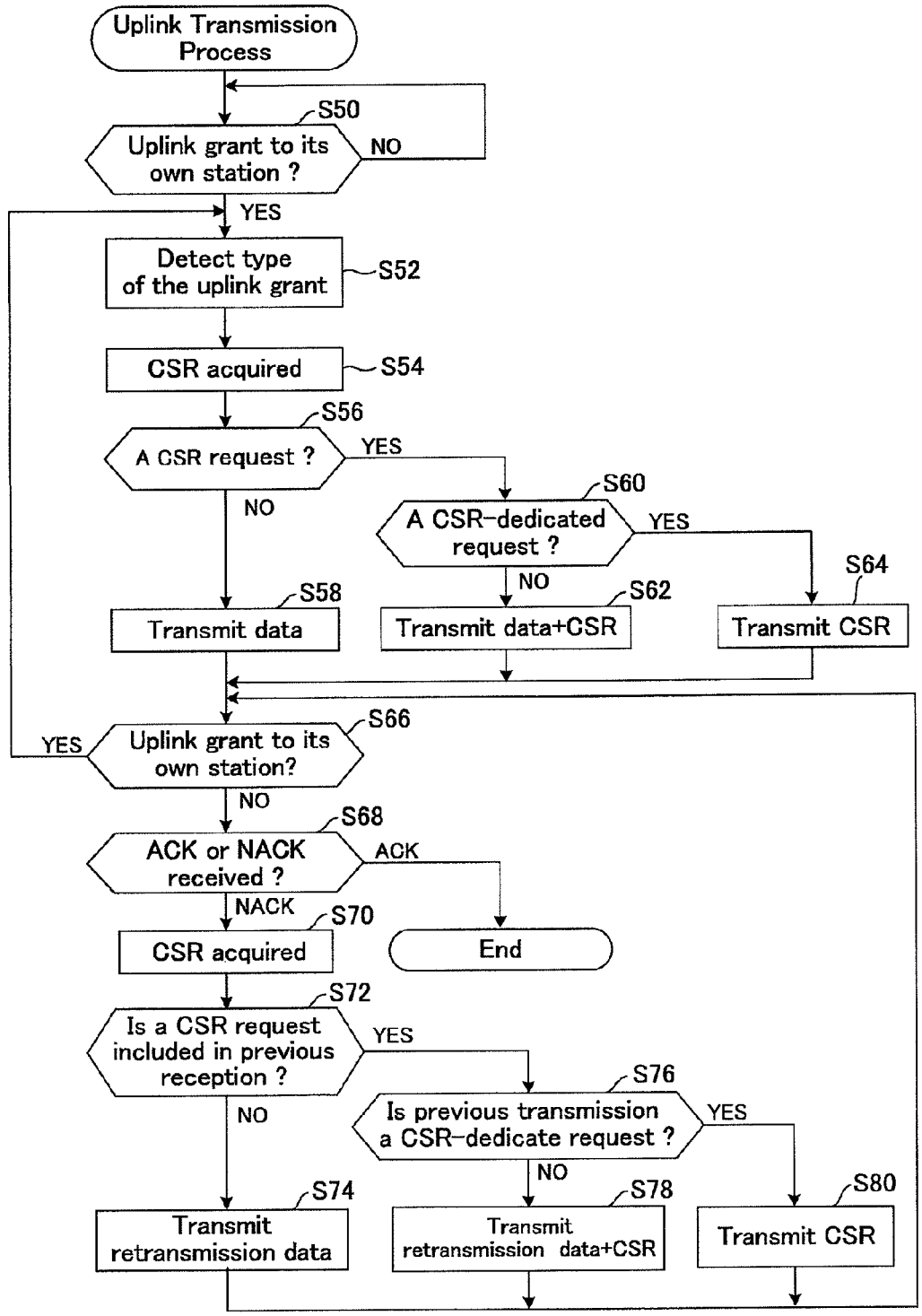
FIG. 10 is an operational flow for illustrating the flow of the process at a mobile station apparatus in the second embodiment.
Figure 11:
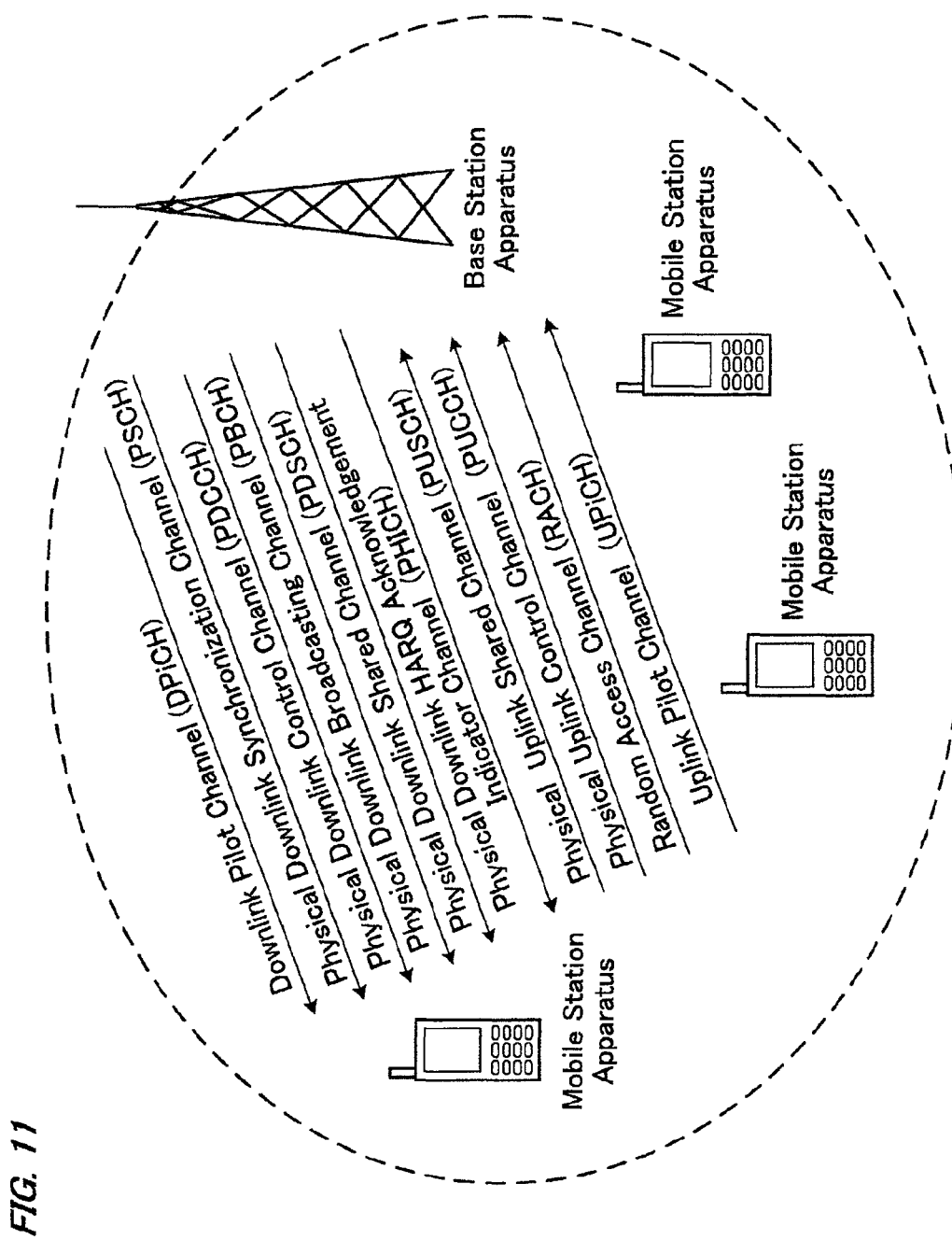
FIG. 11 is diagram showing the scheme of a conventional communication system.
Figure 12:
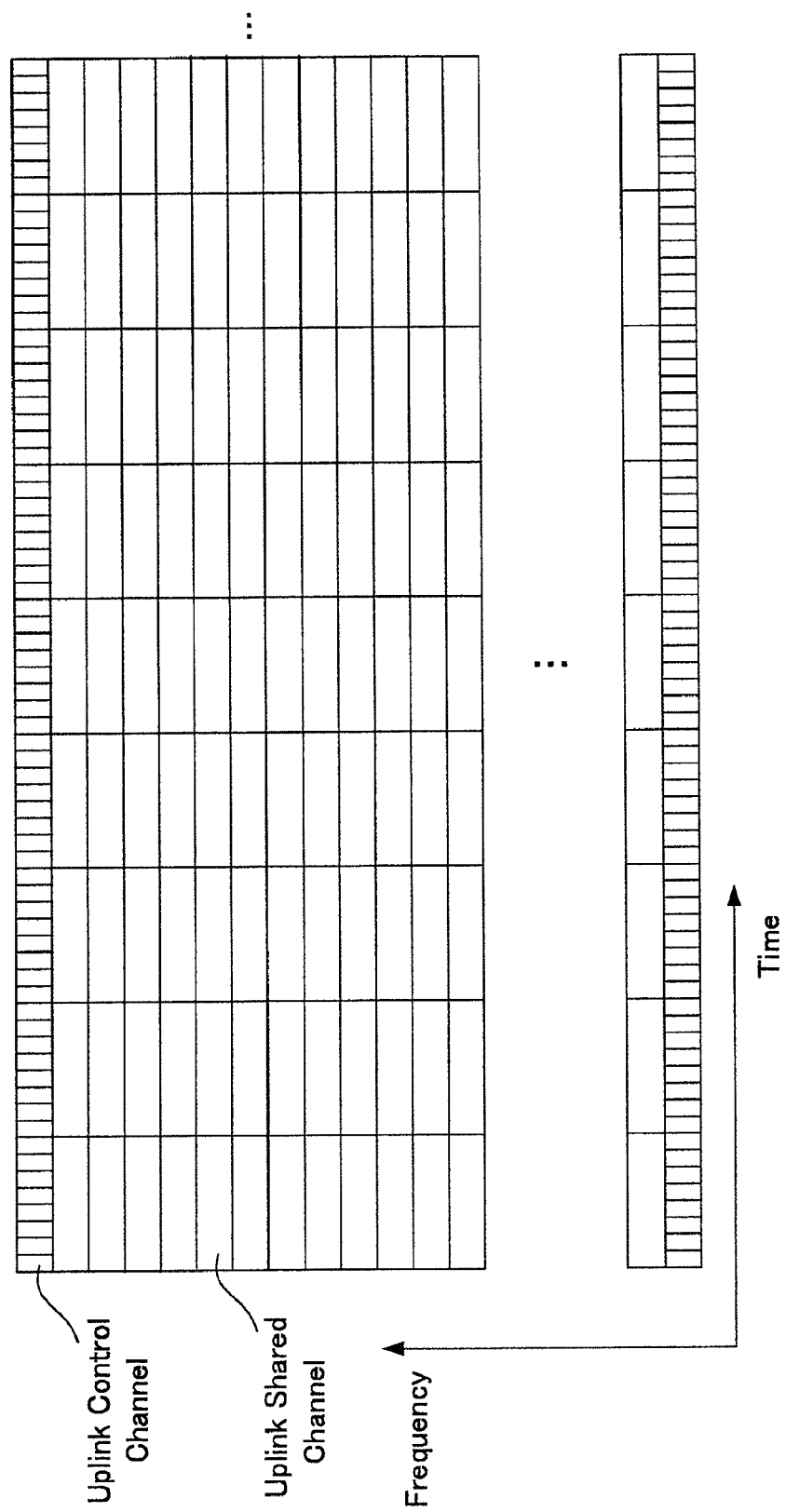
FIG. 12 is diagram showing the scheme of a conventional communication system.
Figure 13:
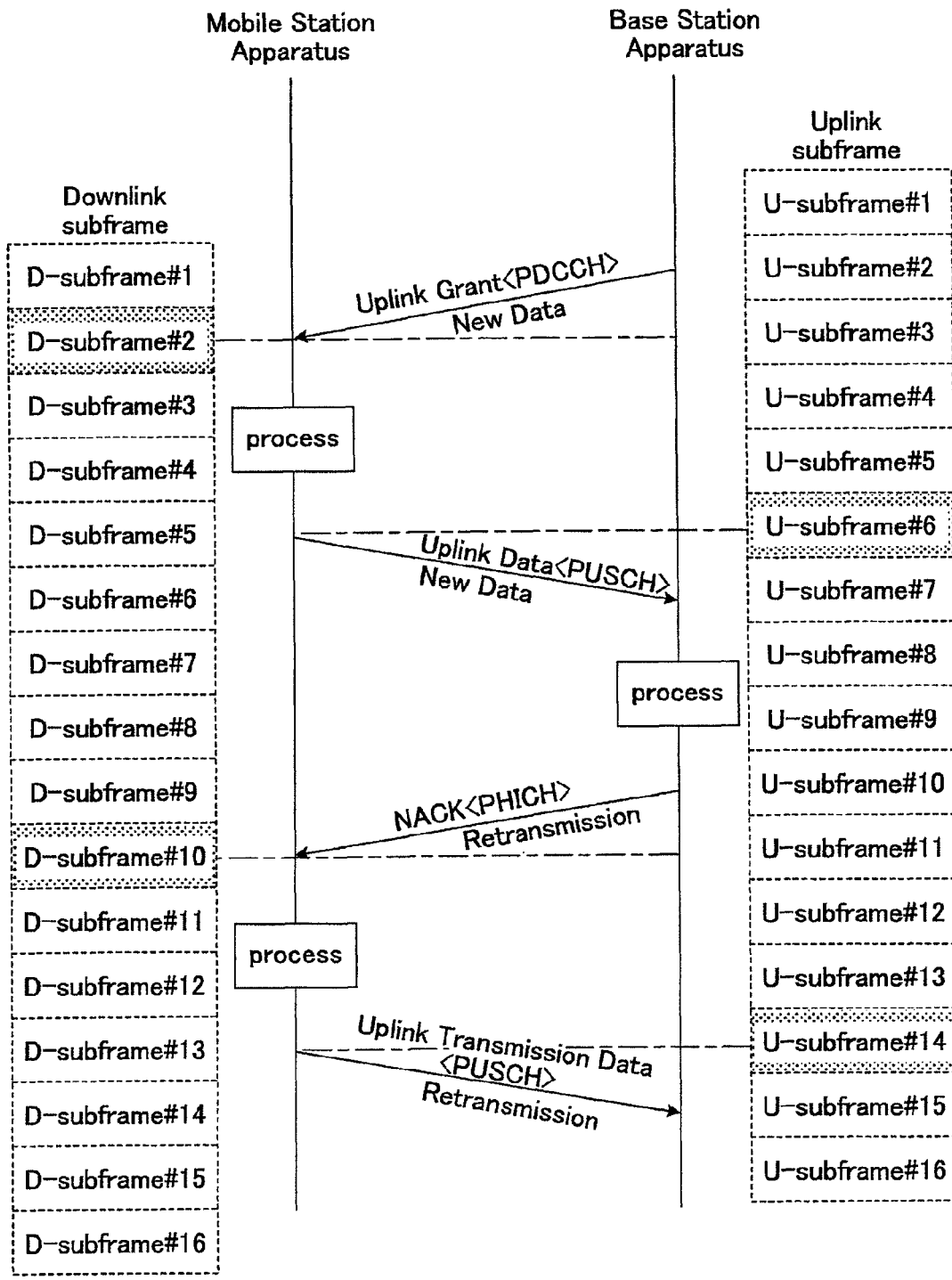
FIG. 13 is a diagram for illustrating conventional communication procedures.
Figure 14:
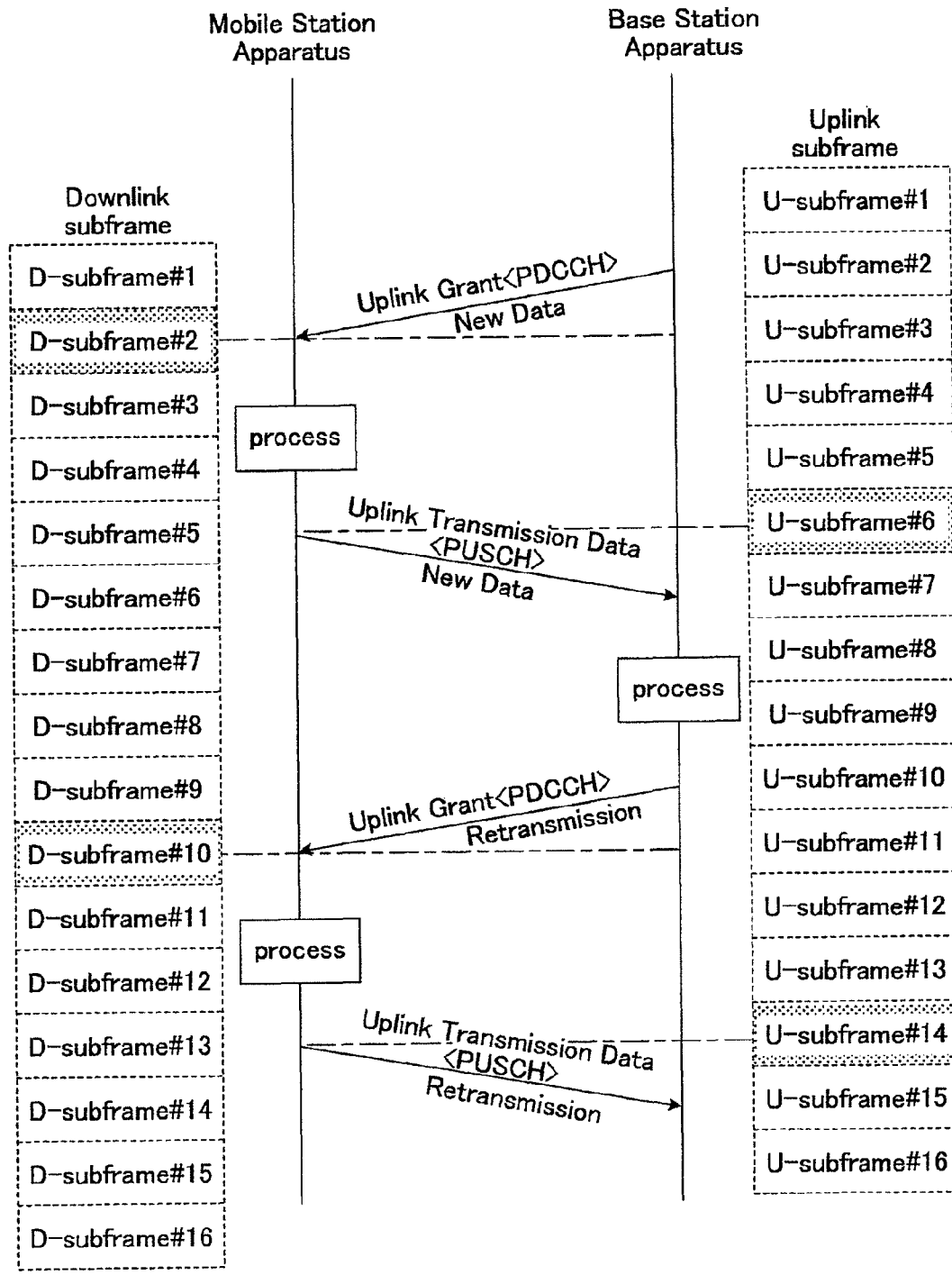
FIG. 14 is a diagram for illustrating conventional communication procedures.

Now, the processing sequence of the mobile station apparatus 5 in the second embodiment will be described with reference to FIG. 10. First, the mobile station apparatus 5 decodes on PDCCH so as to check whether there is the uplink grant to the station of its own (Step S50).

In case that the mobile station apparatus has detected the uplink grant to the station of its own (Step S50; Yes), the mobile station apparatus analyzes the uplink grant to detect the type of the uplink grant (Step S52). The type of the uplink grant herein presents whether the grant requests for the transmission of the channel state information (CSR: Channel State Report), whether the grant requests for the transmission dedicated for the channel state information, or whether the grant indicates the transmission of new data or the transmission of the retransmission data.

Whether the transmission of the channel state information is requested is determined based on whether the request for the transmission of the channel state information is included. Whether the transmission dedicated for the channel state information is requested is determined based on whether the request for the transmission dedicated for the channel state information is included. Whether the grant indicates new data or the retransmission data is determined based on the presence of the new data indicator. This information is stored as the type of the uplink grant. Then, the channel state information (CSR) is acquired from the channel estimator 508 (Step S54). This acquisition step of the channel state information is the same as Step S14.

Here, the channel state information can be acquired by the channel estimator 508 at each time at the acquisition stage at Step S54, or the channel estimator 508 can measure the channel state continuously and acquire the channel state information as required.

In case that the uplink grant does not include the request for the CSR (Step S56; No), the data is transmitted (Step S58). In case that the request for the CSR is included (Step S56; Yes), it is determined whether the request is the CSR dedicated request (Step S60).

Here, in case that the request is the CSR dedicated request (Step S60; Yes), the CSR only that has been acquired at Step S54 is transmitted (Step S64). On the other hand, in case that the request is not the CSR dedicated request, the data and the CSR that has been acquired at Step S54 are transmitted to the base station apparatus 1 (Step S60; No->Step S62).

Here, in case that the type of the uplink grant that was used at the previous transmission is not the CSR dedicated request and the type of the uplink grant that has been newly detected is the CSR dedicated request, the mobile station apparatus 5 determines that the previous transmission has succeeded (the CRC on the base station apparatus 1 side has succeeded), and flushes the buffer for the uplink transmission and writes new data and reports ACK from the scheduler (the MAC layer) to the upper layer.

Subsequently, when the mobile station apparatus 5 completes transmission, and then detects the uplink grant to the station of its own on PDCCH at a timing position associated with the uplink transmission (Step S66; Yes), the operation goes back to the step of detecting the type of the uplink grant (Step S52).

In case that no uplink grant is detected on PDCCH (Step S66; No), it is detected whether PHICH is ACK or NACK (Step S68). Here, in case that ACK has been received (Step S68; ACK), the mobile station apparatus 5 ends the current process.

In case that NACK has been received (Step S68; NACK), the mobile station apparatus 5 acquires the CSR from the channel estimator 508 (Step S70).

At this point, it is determined whether the previously received uplink grant included the CSR request (Step S72). Here, in case that the previous uplink grant included no CSR request, the retransmission data only is transmitted to the base station apparatus 1 (Step S72; No->Step S74).

On the other hand, in case that the previous uplink grant is the CSR dedicated request, the acquired CSR only is transmitted at Step S70 (Step S72; No->Step S76; Yes->Step S80).

Further, in case that the previous uplink grant is not the CSR dedicated request, the retransmission data and the CSR acquired at Step S70 are transmitted to the base station apparatus 1 (Step S72; Yes->Step S76; No->Step S78).

Then, the operation returns to Step S66, entering the PDCCH or PHICH receiving process (i.e., Non-Adaptive HARQ). Here, it should be noted that the mobile station apparatus 5 does not transmit the CSR at the subframe at which the transmission of the CSR is prohibited.

Further, this process can be executed in parallel in the number of the HARQ processes. The above processing is described referring to one synchronous HARQ process only. One synchronous HARQ process operates every time eight subframes are transmitted, and another synchronous HARQ process is operated for the following subframes.

In this way, according to the second embodiment, even in case of receiving the CSR dedicated request, the mobile station apparatus 5 can transmit the channel state information. The base station apparatus 1 can do the scheduling based on the suitable state of communication with the mobile station apparatus 5.

VARIATIONAL EXAMPLE

The above embodiments were described taking an example including a pair of the base station apparatus and the mobile station apparatus, for description convenience. However, it goes without saying that a plurality of the base station apparatuses and the mobile station apparatuses are included.

Further, in the embodiments described heretofore, a program for realizing the individual functions in the base station apparatus and individual functions in the mobile station apparatus may be recorded on a computer-readable recording medium so as to perform control of the base station apparatus and the mobile station apparatus by loading the program recorded on this recording medium into a computer system. The "computer system" mentioned herein may include operating systems and hardware such as peripherals etc.

Further, the "computer readable recording medium" indicates a removable medium such as a flexible disk, magneto-optical disk, ROM, CD-ROM and the like, and a storage device such as a hard disk and the like that is built in a computer system. Examples of the "computer readable recording medium" further include entities that dynamically hold a program in a short period of time such as a communication line when the program is transmitted by way of a communication line such as Internet or other network and telephone lines, etc., and also include, in the above case, entities that hold the program a predetermined period of time such as a volatile memory inside a computer system forming a server or a client. Moreover, the above program may be one that realizes part of the above functions, and one that can realize the aforementioned functions in combination with a program already recorded on a computer system.

Though the embodiments of this invention have been described in detail heretofore with reference to the drawings, the specific configuration is not limited to the embodiments, and designs etc. that will not depart from the spirit of this invention should be included in the scope of Claims.

Further, the type in which the CSR is not transmitted and the type in which the CSR is transmitted when the mobile station apparatus 5 performs retransmission may be provided. In the type in which no CSR is transmitted at the time of retransmission, the CSR is transmitted only when new data is transmitted. In the type in which the CSR is transmitted at retransmission, the CSR will be transmitted at the time of transmitting new data and at the time of retransmission as in embodiment 1 and embodiment 2.

The invention claimed is:

1. A mobile station apparatus transmitting uplink data to a base station apparatus, the mobile station apparatus comprising:
    a transmitting unit transmitting, to the base station apparatus, the uplink data;
    a receiving unit receiving, from the base station apparatus, a transmission grant that includes information indicating transmission of channel state information without the uplink data; and
    a scheduling unit generating an acknowledgment for the uplink data having been transmitted previously in response to receiving, from the base station apparatus, the transmission grant that includes the information indicating transmission of the channel state information without the uplink data after the previous transmitting of the uplink data.

2. A method of a mobile station apparatus transmitting uplink data to a base station apparatus, the method comprising:
    transmitting, to the base station apparatus, the uplink data;
    receiving, from the base station apparatus, a transmission grant that includes information indicating transmission of channel state information without the uplink data; and
    generating an acknowledgment for the uplink data having been transmitted previously in response to receiving, from the base station apparatus, the transmission grant that includes the information indicating transmission of the channel state information without the uplink data after the previous transmitting of the uplink data.

3. A communication apparatus transmitting uplink data to a second communication apparatus, the communications apparatus comprising:
    a transmitter configured to transmit, to the second communication apparatus, the uplink data;
    a receiver configured to receive, from the second communication apparatus, a transmission grant that includes information indicating transmission of channel state information without the uplink data; and a scheduler configured to generate an acknowledgment for the uplink data having been transmitted previously in response to receiving, from the second communication apparatus, the transmission grant that includes the information indicating transmission of the channel state information without the uplink data after the previous transmitting of the uplink data.

* * * * *

UNITED STATES PATENT AND TRADEMARK OFFICE
CERTIFICATE OF CORRECTION

| | | |
|---|---|---|
| PATENT NO. | : 8,280,390 B2 | Page 1 of 1 |
| APPLICATION NO. | : 13/328624 | |
| DATED | : October 2, 2012 | |
| INVENTOR(S) | : Shohei Yamada et al. | |

It is certified that error appears in the above-identified patent and that said Letters Patent is hereby corrected as shown below:

ON THE TITLE PAGE:

At item 63, the Related U.S. Application Data should read as follows:

-- Continuation of application No. 12/864,281, filed as application No. PCT/JP2009/050988 on Jan. 22, 2009, now Pat. No. 8,112,092. --

Signed and Sealed this
Twelfth Day of February, 2013

Teresa Stanek Rea
*Acting Director of the United States Patent and Trademark Office*